(12) United States Patent (10) Patent No.: US 8,169,640 B2
Ooba (45) Date of Patent: May 1, 2012

(54) NETWORK SYSTEM, NETWORK SETUP METHOD, AND PROGRAM AND STORAGE MEDIUM THEREFOR

(75) Inventor: Hideaki Ooba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1193 days.

(21) Appl. No.: 11/467,052

(22) Filed: Aug. 24, 2006

(65) Prior Publication Data

US 2007/0046986 A1 Mar. 1, 2007

(30) Foreign Application Priority Data

Sep. 1, 2005 (JP) .................................. 2005-253220

(51) Int. Cl.
*G06F 3/12* (2006.01)
*G06F 15/177* (2006.01)
*G06F 3/00* (2006.01)
*G06F 1/24* (2006.01)
*G06F 9/00* (2006.01)
*G06F 9/24* (2006.01)
*G06F 9/445* (2006.01)

(52) U.S. Cl. ....... 358/1.15; 709/220; 709/221; 709/222; 710/8; 710/10; 713/1; 713/100; 717/171; 717/173; 717/176; 717/177; 717/178

(58) Field of Classification Search .................. 717/171, 717/173, 174, 176, 177, 178
See application file for complete search history.

(56) References Cited

U.S. PATENT DOCUMENTS

| 5,657,448 | A | * | 8/1997 | Wadsworth et al. | 709/220 |
| 5,692,111 | A | * | 11/1997 | Marbry et al. | 358/1.15 |
| 5,905,906 | A | * | 5/1999 | Goffinet et al. | 710/8 |
| 5,937,150 | A | * | 8/1999 | Phan | 358/1.15 |
| 6,026,436 | A | * | 2/2000 | Hawes | 709/218 |
| 6,292,271 | B1 | * | 9/2001 | Phan | 358/440 |
| 6,301,012 | B1 | * | 10/2001 | White et al. | 358/1.15 |
| 6,349,304 | B1 | * | 2/2002 | Boldt et al. | 1/1 |
| 7,430,055 | B2 | * | 9/2008 | Faynor | 358/1.15 |
| 2002/0015180 | A1 | * | 2/2002 | Tominaga | 358/1.15 |
| 2002/0051200 | A1 | * | 5/2002 | Chang et al. | 358/1.15 |
| 2002/0080391 | A1 | * | 6/2002 | Sugiura et al. | 358/1.15 |
| 2002/0171864 | A1 | * | 11/2002 | Sesek | 358/1.15 |
| 2002/0196451 | A1 | * | 12/2002 | Schlonski et al. | 358/1.1 |
| 2004/0153532 | A1 | * | 8/2004 | Hosotani et al. | 709/222 |
| 2005/0005003 | A1 | * | 1/2005 | Maekawa | 709/223 |
| 2005/0132091 | A1 | * | 6/2005 | Shibata | 710/4 |
| 2006/0047798 | A1 | * | 3/2006 | Feinleib et al. | 709/223 |

FOREIGN PATENT DOCUMENTS

JP 2000-076234 A 3/2000

* cited by examiner

*Primary Examiner* — King Poon
*Assistant Examiner* — Vincent Peren
(74) *Attorney, Agent, or Firm* — Canon U.S.A., Inc., IP Division

(57) ABSTRACT

A network system and network system setting method including a control apparatus connected to a network and an image processing apparatus connected to the control apparatus so as to access the network, where when setup information for the image processing apparatus is transmitted to another image processing apparatus, setup information for the control apparatus is also transmitted.

8 Claims, 10 Drawing Sheets

FIG. 8

```
<Beep>
  <setting=OK>
</Beep>
<User>
  <name="abc">
  <name="123">
</User>
<ID>
  <name="345">
</ID>
<Address>
  <e-mail>
    <name="abc">
    <To="abc:@element.cxm">
    <other="a">
  </e-mail>
</Address>
       ⋮
```
} 901

```
<Extra-Controller>
  <Network>
    <IP>
    <Auto=Yes>
    <IP>
    <DNS>
    <h_name="kurukuru">
    <p_address="111.111.0.249">
    <s_address="0. 0. 0. 0">
    <d_name="doa">
    <DNS>
  </Network>
  <Address>
    <e-mail>
    <name="abc">
    <To="abc:@element.cxm">
    <other="a">
    </e-mail>
  </Address>
       ⋮
</Extra-Controller>
```
} 902

FIG. 13

SUCH AS FD/CD-ROM

| DIRECTORY INFORMATION |
|---|
| FIRST DATA PROCESSING PROGRAM PROGRAM CODE GROUPS CORRESPONDING TO FLOWCHART STEPS IN FIG. 7 |
| SECOND DATA PROCESSING PROGRAM PROGRAM CODE GROUPS CORRESPONDING TO FLOWCHART STEPS IN FIG. 9 |
| THIRD DATA PROCESSING PROGRAM PROGRAM CODE GROUPS CORRESPONDING TO FLOWCHART STEPS IN FIG. 10 |
| FOURTH DATA PROCESSING PROGRAM PROGRAM CODE GROUPS CORRESPONDING TO FLOWCHART STEPS IN FIG. 11 |
| FIFTH DATA PROCESSING PROGRAM PROGRAM CODE GROUPS CORRESPONDING TO FLOWCHART STEPS IN FIG. 12 |
| |

MEMORY MAP OF STORAGE MEDIUM

NETWORK SYSTEM, NETWORK SETUP METHOD, AND PROGRAM AND STORAGE MEDIUM THEREFOR

BACKGROUND OF THE INVENTION

1. Field of the Invention

The present invention relates to a setup method for a network system that includes a control apparatus, connected to a network, and an image processing apparatus that is connected to the control apparatus and can access the network via the control apparatus.

2. Description of the Related Art

A so-called multifunctional apparatus (image processing apparatus) has been put to practical use. This apparatus is an image forming apparatus that includes a printer, which prints image data received by a scanner, and a communication interface that can receive a print job via communication with an external apparatus, such as a host computer.

Some image forming apparatuses of this type include data storage units, such as hard disk drives, as external storage devices. Further, an image forming apparatus, when put to practical use, can perform a secure printing process, i.e., a print job, received from a host computer, is stored and a pre-designated ID information is authenticated and printing of the stored print job is begun.

In Japanese Patent Laid-Open Application No. 2000-76234 (patent document 1), a system is disclosed whereby data is unified that is held by a plurality of data processing apparatuses.

Further, a data transmission function that uses a network has also been developed, and a function for the storage, directly on the hard disk of a computer on a network, of data obtained by scanning has been practically employed.

As described above, since various functions for the image forming apparatus have been put to practical use, multiple setup items are present for the image forming apparatus, and a user (e.g., a manager of an image forming apparatus) must enter all the setups for the functions that are to be employed.

Conventionally as a function for transmitting setup information, the image forming apparatus can transmit its own setup information to another image forming apparatus. By using this function, in a case wherein initial setups of multiple image forming apparatuses are to be initially set, or in a case wherein facilities are being moved, or when there is a change in servers or a change in management methods, a manager need not manually repeat the entry of the setups for the individual image forming apparatuses.

That is, after setup information has been entered in one image forming apparatus, the same information can be delivered to the rest of the image forming apparatuses, and the need for additional labor by a manager is eliminated. At present, no additional effort is required for the delivery of information, for user setups, for ID management setups, and for address book setups that are entered when an initial image forming apparatus is being set up.

However, for an image forming apparatus that is attached to a printing control apparatus (a control apparatus) and that communicates with a network via the printing control apparatus, the network environment wherein the image forming apparatus is operated constitutes a special case. That is, since the setup information related to the network is stored in the printing control apparatus, the image forming apparatus can not transmit this setup information to another image forming apparatus.

Further, since address book information to be held in the image forming apparatus can be set up for and apply only to the image forming apparatus, a user must manually enter the same address book information when setting up the printing control apparatus.

That is, since the setup information transmitted by the image forming apparatus can be set up only for the image forming apparatus, a user must manually supply the same setup information for the printing control apparatus. Thus, an additional operating requirement is required.

SUMMARY OF THE INVENTION

The present invention resolves the above described shortcoming by, in an exemplary embodiment, providing a system whereby, setup information for an image processing apparatus and setup information for a control apparatus connected to the image processing apparatus can easily be transmitted to a different image processing apparatus.

According to one aspect of the invention, a network system includes a control apparatus connected to a network, a first image processing apparatus, connected to the control apparatus, so as to access the network via the control apparatus, and a setup information transmitting unit adapted to transmit to a second image processing apparatus, setup information for the control apparatus together with setup information for the first image processing apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram showing the structure of data to be transmitted at step S407 in FIG. 7.

FIG. 13 is a diagram for explaining a memory map for a storage medium (a recording medium) in which various data processing programs, readable by the image forming apparatus and the printing control apparatus that constitute the network system of the present invention, are stored.

DESCRIPTION OF THE EMBODIMENTS

First Exemplary Embodiment

Figure 1:
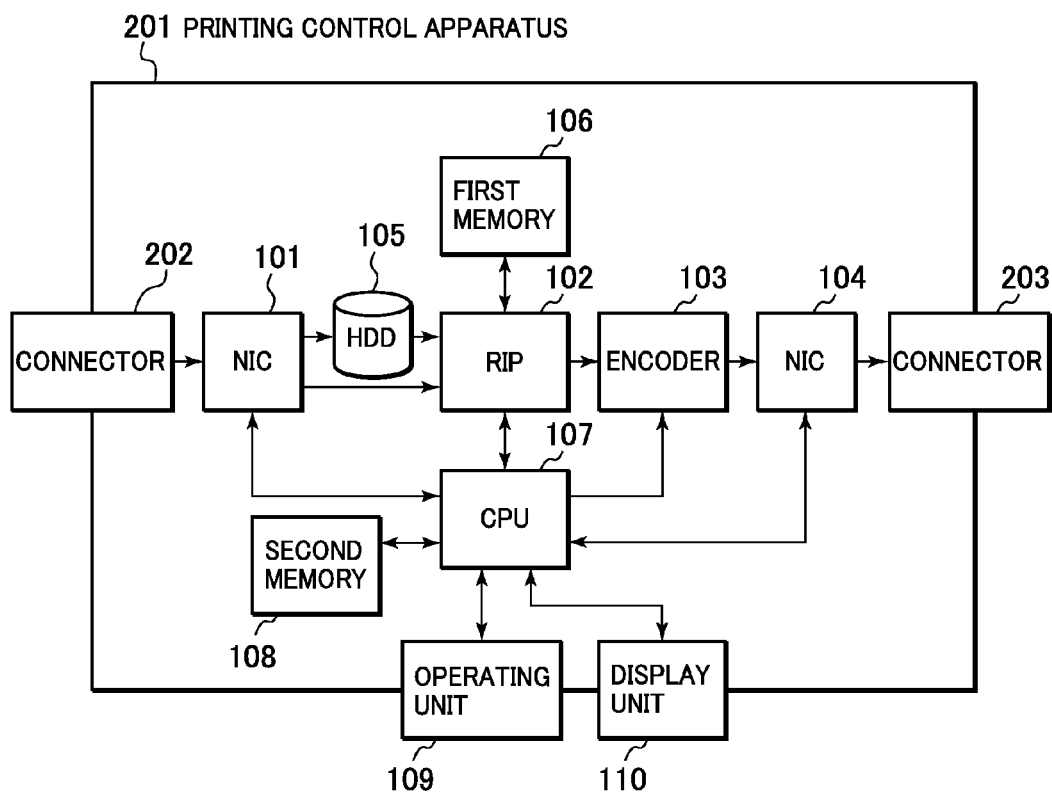
FIG. 1 is a schematic block diagram showing the configuration of a printing control apparatus to which a network system according to the present invention can be applied.

FIG. 1 is a schematic block diagram showing an example configuration of a printing control apparatus to which a network system according to a first embodiment of the present invention can be applied.

Figure 2:
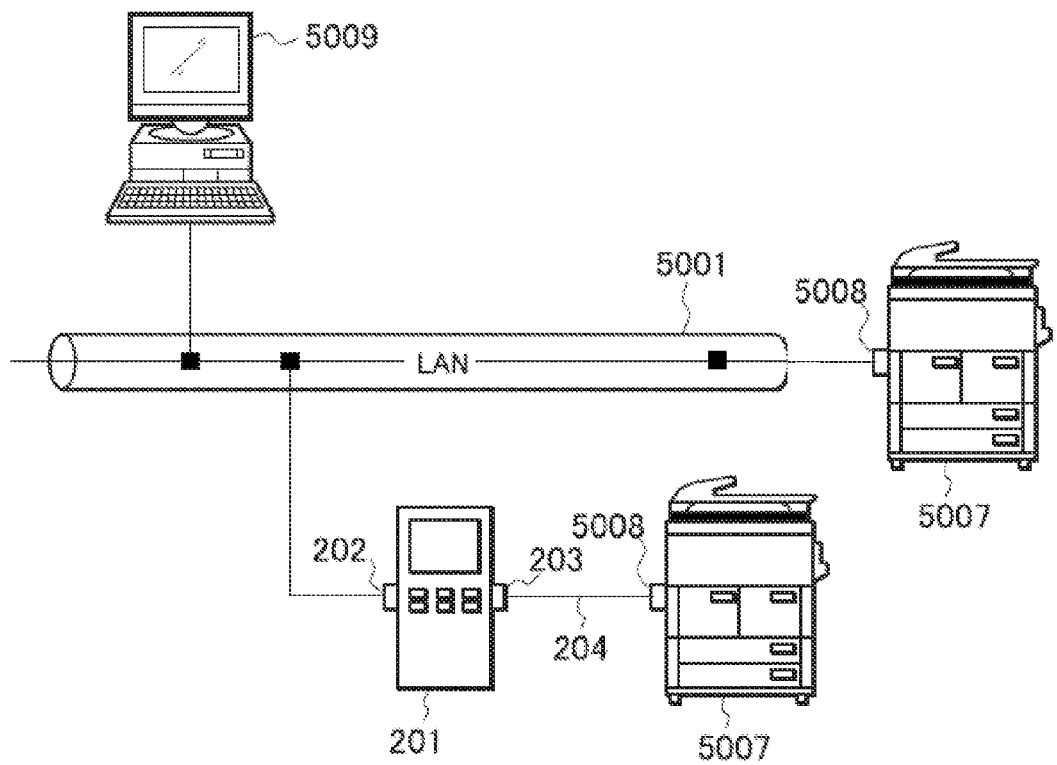
FIG. 2 is a diagram showing a connection between a printing control apparatus and an image forming apparatus to which the network system of the invention is applied.

FIG. 2 is a diagram showing the connection state between the printing control apparatus, to which the network system for this embodiment can be applied, and an image forming apparatus.

In FIG. 1, connectors 202 and 203 are provided for a printing control apparatus (control apparatus) 201. A network interface card (NIC) 101 serves as a first network interface to be connected to a LAN 5001 (FIG. 2) at a low layer level. An RIP 102 performs raster image processing for received data that is described in a print language, such as PDL, or a specific data format (compressed by JBIG). An encoder 103 converts raster image data into print data, or a data format, supported by an image forming apparatus 5007.

A NIC 104 is a second network interface to be connected to a LAN 204 (FIG. 2) at a low layer level.

A hard disk drive (HDD) 105 is used to temporarily store (spool) print data received by the NIC 101. A first memory 106 is used by the RIP 102 to perform raster image processing. A CPU 107 executes, on a second memory 108, a program stored on the HDD 105 or on a recording medium (not shown), and controls the entire printing apparatus. The second memory 108 is used by the CPU 107 as a temporary data storage area.

An operating unit 109 includes buttons, keys and a touch panel, with which instructions are entered for the performance of the operations of the printing control apparatus 201. The touch panel is connected to a display unit 110. The display unit 110 is used to present information to an operator using images and characters, or to display soft keys the operator can use to perform an operation on the touch panel.

As shown in FIG. 2, when a data packet is to be transmitted from a terminal device 5009, such as a personal computer, to the printing control apparatus 201, the data packet is transferred via the LAN 5001, and through the connector 202, to the printing control apparatus 201. It should be noted that in the network for this embodiment, a plurality of image forming apparatuses (e.g., image forming apparatus 5007), to which the printing control apparatus is connected, and a plurality of independent image forming apparatuses 5007 are connected to the LAN 5001.

The NIC 101 of the printing control apparatus 201 performs a reception process for a data packet. A data packet received by the NIC 101 conforms to the TCP/IP protocol (a TCP or UDP (User Datagram Protocol) packet is employed). Therefore, an address port number is included in the header information portion of a packet.

The address port number is information indicating which program/process of an apparatus that has received a packet data should be transmitted. A different port number is allocated to each communication protocol or each program. For example, "FTP (File Transfer Protocol)=Port21, SMTP (Simple Mail Transfer Protocol)=Port 25, SNMP=Part161".

Therefore, when a port number included in the header of a received data packet is examined to determine whether the port number corresponds to a printing process, it is possible to determine whether the received packet is print data or other data, such as control data.

The NIC 101 extracts the address port number from the header of a received data packet, and employs the address port number to determine whether the received data packet is print data or control data.

When it is determined that the received data packet is print data, writing of the received data to the HDD 105 is performed, as needed, under the control of the CPU 107. This process is queuing (spooling), which is generally performed in order to improve the data transfer rate. Data stored on the HDD 105 is read by the RIP 102, in accordance with an instruction issued by the CPU 107. Print data for which queuing has not been performed is transmitted directly to the RIP 102 in accordance with an instruction issued by the CPU 107.

The RIP 102 performs the raster image processing for the received print data. Sequentially, the encoder 103 encodes the raster image data using a data form that can be translated by the image forming apparatus 5007. In this embodiment, the encoder 103 serves as a second determination unit and a data form converter.

The data form that can be translated by the image forming apparatus 5007 may be received as a communication from the image forming apparatus 5007, or may be designated via the operating unit 109. The encoding process is performed as needed, and may be skipped when, for example, received print data can be translated by the image forming apparatus 5007 without any particular processing being required. The encoded data must be in a form translated by the image forming apparatus, and this form is changed in accordance with the capability of the translation function of the image forming apparatus 5007, i.e., a specific print language form or a data format compressed using a specific method, such as the JBIG method.

Data encoded as needed is formed into a packet again by the NIC 104 in order to be transmitted to the LAN 204. This data packet is output by the connector 203, and is transmitted via the LAN 204 and a network interface 5008 to the image forming apparatus 5007. Upon receiving the data packet, the image forming apparatus 5007 follows its own printing processing procedures and initiates the printing of the data on a recording medium, such as paper.

When an image forming apparatus 5007 transmits, to the terminal device 5009, image data scanned by a reader 303, a data packet is transmitted via the network interface 5008 to the LAN 204, and reaches the connector 203. When the printing control apparatus 201 receives the data packet, it examines the address of the data packet. When the data packet is addressed to the terminal device 5009, the data packet is transmitted via the connector 202 to the LAN 5001, and subsequently arrives at the terminal device 5009.

Figure 3:
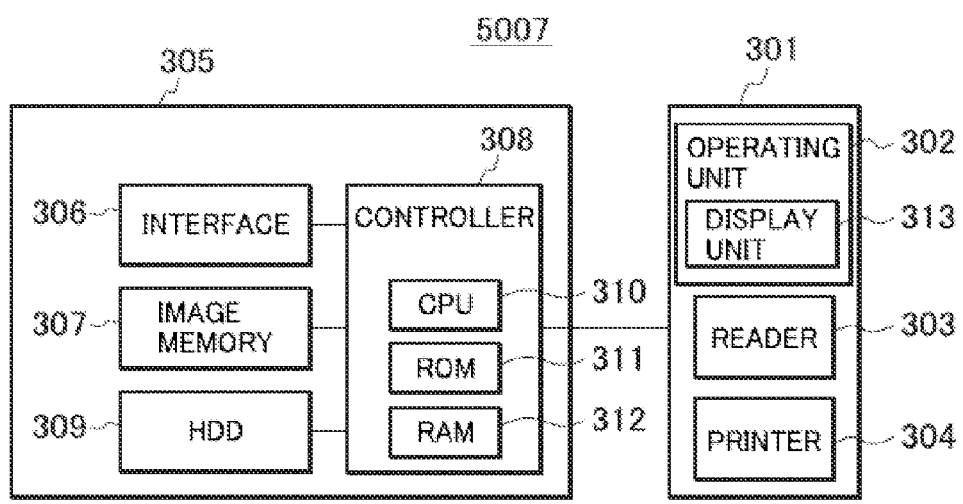
FIG. 3 is a block diagram showing an example arrangement for the image forming apparatus shown in FIG. 2.

FIG. 3 is a block diagram showing an example arrangement of the image forming apparatus 5007 shown in FIG. 2.

In FIG. 3, the image forming apparatus 5007 of this embodiment is a multifunctional apparatus including an image forming apparatus main body 301 and an image input/output controller 305.

The image forming apparatus main body 301 includes an operating unit 302, a reader 303 and a printer 304. The operating unit 302 is used to operate the image forming apparatus main body 301 and the image input/output controller 305. The operating unit 302 includes a display unit 313, to which a touch panel (not shown) is connected. On the display unit 313, images or characters are displayed to present information to an operator, or soft keys are displayed that permit the operator to perform an operation using the touch panel.

The reader 303 reads an image of an original, and outputs image data consistent with the original to the printer 304 and the image input/output controller 305. The printer 304 records, on a recording medium, an image consistent with the image data received from the reader 303 and the image input/output controller 305. The present invention can be applied when the printer 304 is a laser beam type, an electrophotographic type (e.g., an LED type), a liquid crystal shutter type, an inkjet type, a thermal transfer type, a sublimation type or any another type of printer.

The image input/output controller 305 is connected to the reader 303, and includes an interface 306, an image memory 307, a controller 308 and a hard disk (HDD) 309. The setup for the image forming apparatus 5007 is stored on the hard disk (HDD) 309 (e.g., an address book, an operation history, a user setup, an ID setup and a network setup). Furthermore, in this embodiment, setup information for the image forming apparatus 5007 is called setup data, and the controller 308 imports the setup data based on various operating instructions that will be described later.

The interface 306 is located between the printing control apparatus 201 and the controller 308, and is connected to the network interface 5008 shown in FIG. 2. Further, the interface 306 develops, into image data that can be recorded by the printer 305, code data that are transferred by the printing control apparatus 201 and that represent an image, and transmits the developed image data to the controller 308. The interface 306 may be a network interface, e.g., Ethernet, and may be connected to the printing control apparatus 201 via a network. Or, the interface 306 may, for example, be a parallel interface or a USB interface, and be connected directly to the printing control apparatus 201 via an interface cable.

The controller 308 includes a CPU 310, a ROM 311 and a RAM 312. The CPU 310 loads, into the RAM 312, a program stored in the ROM 311 or on another storage medium, (including the HDD 309), and executes the program to control the transmission of data among the reader 303, the interface 306, and the image memory 307.

Instead of the HDD 309, another nonvolatile memory, wherein data is not erased when the power is removed, may be provided, and data may be stored in the nonvolatile memory.

Figure 4:
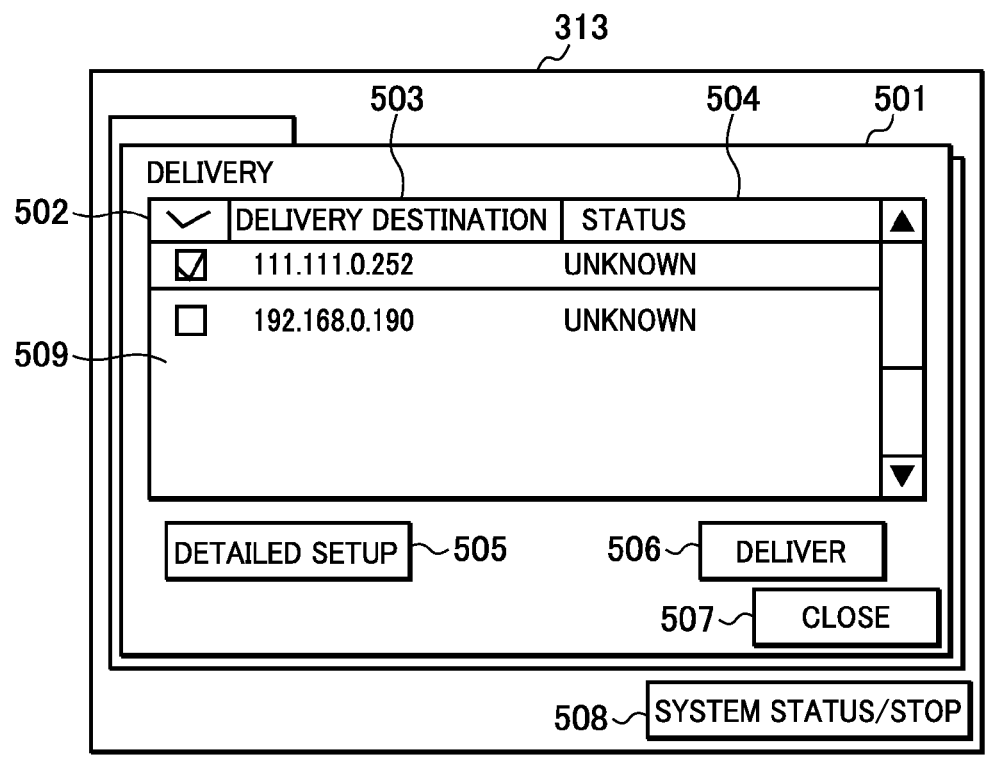
FIG. 4 is a diagram showing an example delivery screen displayed on the display unit of the operating unit of the image forming apparatus shown in FIG. 3.

FIG. 4 is a diagram showing an example delivery screen displayed on the display unit 313 of the operating unit 302 of the image forming apparatus 5007 in FIG. 3.

A delivery screen 501 in FIG. 4 is used to perform a delivery operation. The delivery screen 501 appears when a predetermined button, provided on the main screen (not shown) displayed on the display unit 313, is selected. The delivery screen 501 includes a text area 509, a detailed setup button 505, a deliver button 506, a close button 507 and a system status/stop button 508.

The text area 509 includes a check box 502, a delivery destination display column 503 and a status display column 504. The CPU of the controller 308 displays, in the text area 509, a delivery destination designated by a user (registered on the HDD 309), based on the use of a delivery destination registration screen. When a user issues an instruction for the delivery of setup information, the user enters a tick mark, by touching the check box 502, and then selects the delivery button 506. As a result of this operation, the CPU 310 performs the processing shown in the flowchart in FIG. 7, and transmits setup data to the image forming apparatus 5007 that is registered and displayed in the delivery destination display column 503.

When the close button 507 is selected, the display of the delivery screen 501 is ended by the CPU 310.

The status of a target image forming apparatus 5007 is displayed in the status display column 504. That is, the CPU 310 communicates with the target image forming apparatus 5007 and acquires its status, and then displays the obtained status.

When the system status/stop button 508 is selected, the CPU 310 displays, on the display unit 313, current information for the image forming apparatus 5007 (e.g., the system status). By referring to the display of this information, the user can determine the status of the image forming apparatus 5007.

When the user selects the detailed setup button 505, the CPU 310 changes the display on the display unit 313 to a delivery setup screen (FIG. 5) in order to set the contents of setup data to be transmitted to another image forming apparatus.

Figure 5:
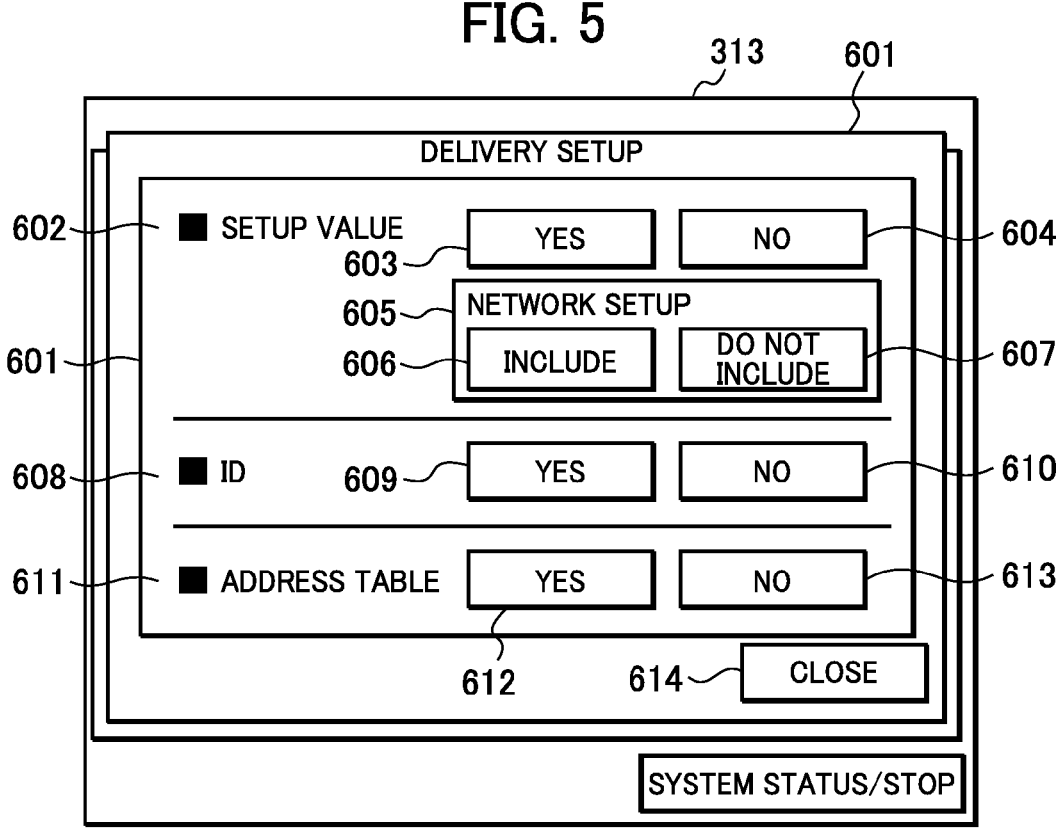
FIG. 5 is a diagram showing an example delivery setup screen displayed on the display unit of the operating unit of the image forming apparatus shown in FIG. 3.

FIG. 5 depicts an example delivery setup screen displayed on the display unit 313 of the operating unit 302 of the image forming apparatus 5007 shown in FIG. 3.

In FIG. 5, a delivery setup screen 601 is a screen a user can employ to select items (e.g., a setup value, an ID and an address table) to be included in setup data. The delivery setup screen 601 includes a setup value delivery setup column 602, an ID delivery setup column 608, an address table delivery setup column 611, and a close button 614.

The setup value delivery setup column 602 is used to designate whether setup values, such as a setup for a beep sound and a user setup, should be included in the setup data that is to be delivered. In the setup value delivery setup column 602, a "YES" button 603 is selected when setup values should be included in setup data. A "NO" button 604 is selected when setup values need not be included in setup data. Either the "YES" button 603 or the "NO" button 604 can be selected at any given time, i.e., both buttons can not be selected at the same time.

Network setup field 605 is used to designate whether network setup information, such as the setup of an IP address and the DNS setup, should be included in setup data to be delivered. In the network setup field 605, an "INCLUDE" button 606 is selected when network setup information stored in the printing control apparatus 201 should be included in the above described setup value. A "DO NOT INCLUDE" button 607 is selected when network setup information stored in the printing control apparatus 201 should not be included in the setup value. Either the "INCLUDE" button 606 or the "DO NOT INCLUDE" button 607 can be selected at any given time, i.e., only one of the buttons can be selected at any given time. Further, the setup of the network setup field 605 is permitted by the CPU 310 only when the "YES" button 603 in the setup value delivery setup column 602 is selected.

The network setup field 605 may be designated as an item, independent of the setup value delivery setup column 601.

The ID delivery setup column 608 is used to designate whether a user ID, for example, should be included in the setup data to be delivered. In the ID delivery setup column 608, a "YES" button 609 is selected when an ID should be included in the setup data to be delivered. A "NO" button 610 is selected when an ID need not be included in the setup data to be delivered. Either the "YES" button 609 or the "NO" button 610 can be selected at any given time, i.e., only one of the buttons can be selected at any given time.

The address table delivery setup column 611 is used to designate whether an address table in which addresses, such as email addresses and facsimile numbers, are stored should be included in the setup data to be delivered. In the address table delivery setup column 611, a "YES" button 612 is selected when an address table should be included in the setup data to be delivered. A "NO" button 613 is selected when an address table need not be included in the setup data to be delivered. Either the "YES" button 612 or the "NO" button 613 can be selected at any given time, i.e., only one of the buttons can be selected at any given time.

The close button 614 is selected to end the delivery setting process. When the close button 614 is selected, the CPU 310 stores, on the HDD 309, the delivery setups entered in the individual items on the delivery setup screen 601, closes the delivery setup screen 601, and changes the display on the display unit 313 to the delivery screen 501 shown in FIG. 4.

The above described setup data, such as the setup value, the ID and the address table, are designated on a setup screen (not shown), or are obtained externally, via the interface 306, and are stored on the HDD 309. It should be noted that when the printing control apparatus 201 is connected to the image forming apparatus 5007, the above network setup information is stored on the HDD 105 of the printing control apparatus 201. When the printing control apparatus 201 is not connected to the image forming apparatus 5007, the network setup information is stored on the HDD 309 of the image forming apparatus 5007.

The printing control apparatus 201 can designate whether the printing control apparatus 201 is to exchange network setup information with the image forming apparatus 5007 (setup for transmission/reception of network setup). This designation is stored on the HDD 105 of the printing control apparatus 201.

Through the above described setting, only information that a user desires to designate can be set.

The processing performed by the printing control apparatus 201 to set up the transmission/reception of a network setup will now be described while referring to FIG. 6.

Figure 6:
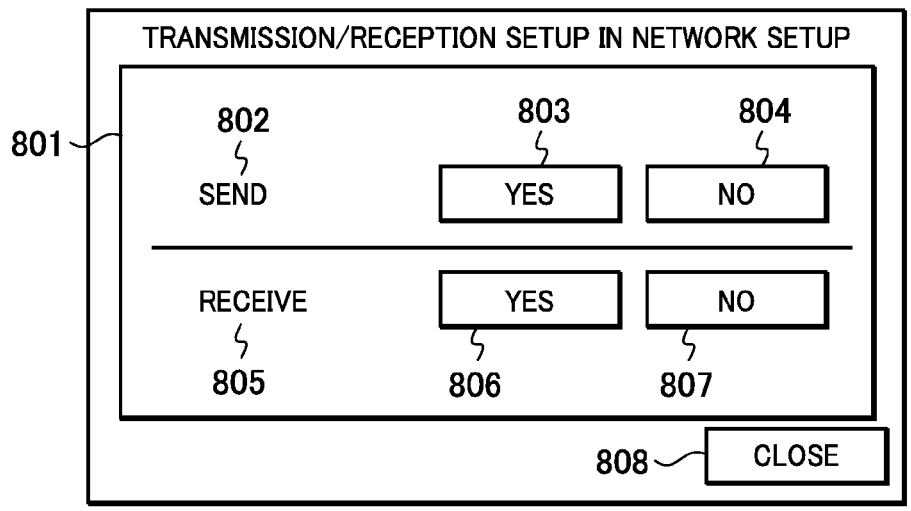
FIG. 6 is a diagram showing an example screen for a transmission/reception setup included in a network setup for the printing control apparatus shown in FIG. 1.

FIG. 6 is a diagram showing an example screen for setting up the transmission/reception of a network setup for the printing control apparatus 201 in FIG. 1.

When a predetermined operation is performed on the operating unit 109 of the printing control apparatus 201, under the control of the CPU 107, a network setup transmission/reception setup screen 801 in FIG. 6 is displayed on the display unit 110. The network setup transmission/reception setup screen 801 includes a transmission setup column 802, a reception setup column 805 and a close button 808.

The transmission setup column 802 is used to designate whether network setup information should be transmitted to the image forming apparatus 5007. In the transmission setup column 802, a "YES" button 803 is selected, through the operating unit 109, when network setup information is to be transmitted to the image forming apparatus 5007. A "NO" button 804 is selected, through the operating unit 109, when network setup information is not to be transmitted to the image forming apparatus 5007. Either the "YES" button 803 or the "NO" button 804 can be selected at any given time, i.e., only one of the buttons can be selected at any given time.

The reception setup column 805 is used to designate whether network setup information should be received from the image forming apparatus 5007. In the reception setup column 805, a "YES" button 806 is selected, through the operating unit 109, when network setup information is to be received from the image forming apparatus 5007. A "NO" button 807 is selected, through the operating unit 109, when network setup information need not be received from the image forming apparatus 5007. Either the "YES" button 806 or the "NO" button 807 can be selected at any given time, i.e., only one of the buttons can be selected at any given time.

The close button 808 is selected to instruct the ending of the delivery setting process. When the close button 808 is selected, through the operating unit 109, the CPU 107 stores on the HDD 105 the setting for the transmission/reception of the network setup, which has been designated using the network setup transmission/reception setup screen 801. Then, the CPU 107 closes the network setup transmission/reception setup screen 801.

The printing control apparatus 201 may not include means for accepting a user's setup entry. For example, on the network setup transmission/reception setup screen 801, the setup may always be either "transmit" or "receive".

The setup data delivery processing according to the first embodiment will now be described while referring to FIGS. 7 to 9.

Figure 7:
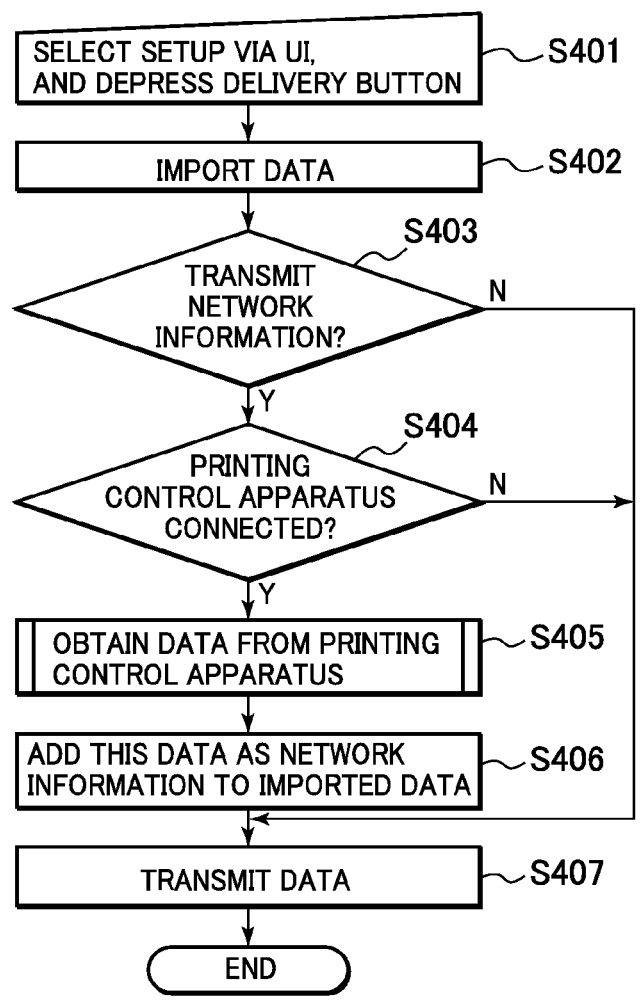
FIG. 7 is a flowchart showing example first control processing performed by the network system of the invention.

FIG. 7 is a flowchart showing an example first control processing performed by the network system according to the first embodiment. The processing in this flowchart corresponds to the processing performed when the image forming apparatus 5007 transmits setup data, such as a setup value, an ID, and an address table, to another apparatus stored in the image forming apparatus 5007 and network setup information stored in the printing control apparatus 201. The processing in this flowchart is provided when the CPU 310 loads into the RAM 311 a program stored in the ROM 311 or on the HDD 309, or in another recording medium, and executes this program.

First, at step S401, on the delivery screen 501 (FIG. 4) displayed on the display unit 313 of the operating unit 302 of the image forming apparatus 5007, a user selects delivery destinations using the check box 502, and selects the delivery button 506. Upon the detection of this action, the CPU 310 shifts the processing to step S402, and starts a process for the transmission of setup data to the delivery destinations.

At step S402, the CPU 310 imports setup data from the HDD 309 based on the delivery setup that is designated on the delivery setup screen 601 in FIG. 5 and is stored on the HDD 309. That is, the CPU 310 obtains, from the HDD 309, setup data the user designates is to be delivered. Sequentially, the CPU 310 generates a tag for each of the items of setup data, generates data (data 901 in FIG. 8) marked up, using the tags, and temporarily stores the data in the RAM 312 as transmission data.

At step S403, based on a network setup delivery setup, which is designated using the network setup column 605 on the delivery setup screen 601 in FIG. 5 and is stored on the HDD 309, the CPU 310 determines whether network setup information should be transmitted.

When, at step S403, the CPU 310 determines that network setup information is not to be transmitted ("NO" in step S403), program control is shifted to step S407. At step S407, the CPU 310 transmits the data temporarily stored in the RAM 312 to individual delivery destinations selected in the checkboxes 502 in FIG. 5 at step S401. When transmission is ended, the processing is terminated.

When, at step S403, the CPU 310 determines that network setup information is to be transmitted, program control advances to step S404, and the CPU 310 performs an examination to determine whether the printing control apparatus 201 is connected to the image forming apparatus 5007. In performing the examination, for example, the current setup information for the image forming apparatus 5007 stored on the HDD 309 can be employed. On the other hand, a confirmation packet may be transmitted directly to the printing control apparatus 201, and whether a reply is received may be employed to determine whether the printing control apparatus 201 is connected. The hardware connection state may also be examined to determine whether the printing control apparatus 201 is connected.

When, at step S404, the CPU 310 determines that the printing control apparatus 201 is not connected to the image forming apparatus 5007, the CPU 310 obtains, from the HDD 309, network setup information for the image forming apparatus 5007. Then, the CPU 310 adds the network setup information to data that is temporarily stored in the RAM 312 (e.g., adds data in a manner as indicated by 902 in FIG. 8). Program control is thereafter shifted to step S407.

When, at step S404, the CPU 310 determines that the printing control apparatus 201 is connected to the image forming apparatus 5007, program control advances to step S405. At step S405, the CPU 310 performs a process (a data acquisition process) for obtaining network setup information from the printing control apparatus 201. This process will be described later in detail while referring to FIG. 9.

When network setup data is received from the printing control apparatus 201, at step S406, the CPU 310 adds the received data to data that has been prepared and is temporarily stored in the RAM 311. For example, the data is added by being marked up, using tags, in the manner as indicated by 902 in FIG. 8. Further, when the delivery setup, which is designated on the delivery setup screen in FIG. 5 and is stored on the HDD 309, indicates that network setup information should be included in a setup value, the CPU 310 is operated as follows. The CPU 310 stores data, obtained from the printing control apparatus 201, in the "setup value" item in data that have been prepared and are temporarily stored in the RAM 311.

When the process at step S406 is ended, the CPU 310 shifts the process to step S407.

At step S407, the CPU 310 transmits the data temporarily stored in the RAM 312 to individual destinations that are selected using the checkboxes 502 in FIG. 4 in the process at step S401. When the transmission process is ended, the processing is terminated.

FIG. 8 is a diagram showing the data structure of data transmitted at step S407 in FIG. 7. The data structure shown in FIG. 8 is merely an example for this embodiment, and any another data structure that would enable practice of the present invention may be employed.

In FIG. 8, transmission data 901 is generated based on data stored on the HDD 309 of the image forming apparatus 5007. Data 902 is resultant data acquired by adding, to the data 901, data (network setup information) obtained from the printing control apparatus 201.

Instead of preparing a data area for the printing control apparatus 201, setup information (network setup information) for the printing control apparatus 201 may be stored (overwritten) in the network setup information in the "setup value" item of the image forming apparatus 5007.

Figure 9:
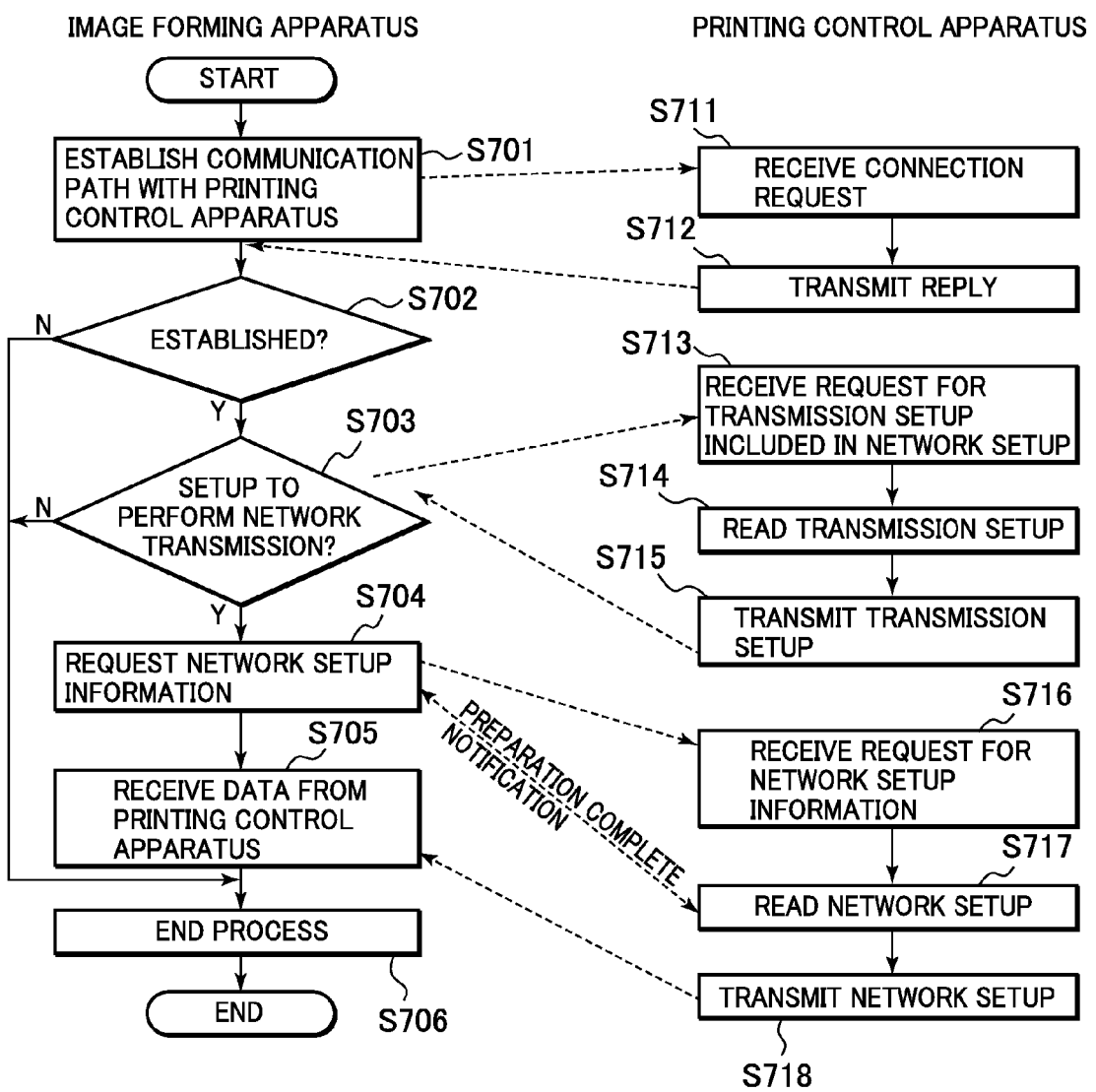
FIG. 9 is a flowchart showing example second control processing performed by the network system of the invention.

FIG. 9 is a flowchart showing an example second control processing performed by the network according to this embodiment. The second control processing corresponds to the data acquisition process at step S405 in FIG. 7. The processes at steps S701 to S706 are provided when the CPU 310 of the image forming apparatus 5007 loads into the RAM 312 a program stored in the ROM 311, on the HDD 309 or in another recording medium, and executes this program. The processes at steps S711 to S718 are provided when the CPU 107 of the printing control apparatus 201 loads into the second memory 108 a program stored on the HDD 309 or in another recording medium, and executes the program.

First, at step S701, the CPU 310 of the image forming apparatus 5007 establishes communication with the printing control apparatus 201. The image forming apparatus 5007 and the printing control apparatus 201 may be connected via a network, or by, for example, USB. In this embodiment, the image forming apparatus 5007 and the printing control apparatus 201 are connected via a network to establish communication.

The CPU 310 of the image forming apparatus 5007 transmits a packet to the address of the printing control apparatus 201 in order to establish a data transmission path. When the CPU 107 of the printing control apparatus 201 receives a packet (a connection request) from the image forming apparatus 5007 (step S711), the CPU 107 transmits to the image forming apparatus a reply indicating that communication has been established (step S712).

At step S702, the CPU 310 of the image forming apparatus 5007 performs an examination to determine whether a reply from the printing control apparatus 201 has been received, so as to determine whether a data connection with the printing control apparatus 201 has been established. When, at step S702, the CPU 310 of the image forming apparatus 5007 determines that a data connection with the printing control apparatus 201 has not been established, program control is shifted to step S706.

When, at step S702, the CPU 310 determines that a data connection with the printing control apparatus 201 has been established, program control advances to step S703.

At step S703, the CPU 310 of the image forming apparatus 5007 determines whether the transmission of network setup information, which is entered for the printing control apparatus 201, has been designated (designated in the transmission setup column 802 in FIG. 6). Specifically, the CPU 310 transmits a request across the communication path established at step S701 to set up the transmission of the network setup that is stored on the HDD 105 of the printing control apparatus 201. When the CPU 107 of the printing control apparatus 201 receives, from the image forming apparatus 5007, the request for a transmission setup for the network setup (step S713), the CPU 107 obtains (reads) the transmission setup for the network setup from the HDD 105 of the printing control apparatus 201 (step S714). Then, the CPU 107 transmits to the requesting image forming apparatus 5007 the obtained network setup transmission setup (step S715).

The CPU 310 of the image forming apparatus 5007 receives the network setup transmission setup from the printing control apparatus 201. Sequentially, the CPU 310 determines whether the transmission of network setup information has been designated to the network setup transmission setup that has been designated for the printing control apparatus 201.

When, at step S703, the CPU 310 determines that the network setup transmission setup designated for the printing control apparatus 201 does not represent the transmission of network setup information, the CPU 310 shifts the process to step S706.

When, at step S703, the CPU 310 determines that the network setup transmission setup designated for the printing control apparatus 201 represents the transmission of network setup information, the CPU 310 advances the process to step S704.

At step S704, the CPU 310 of the image forming apparatus 5007 issues a request to the printing control apparatus 201 to transmit the network setup information that is stored on the HDD 105 of the printing control apparatus 201. When the CPU 107 of the printing control apparatus 201 receives, from the image forming apparatus 5007, the request for the transmission of the network setup information (step S716), at step S717, the CPU 107 obtains (reads) the network setup information from the HDD 105. Following this, the CPU 107 of the printing control apparatus 201 prepares for the transmission of the network setup information to the image forming apparatus 5007, and when the preparation has been completed, transmits to the image forming apparatus 5007 a notification indicating the preparation has been completed.

When the CPU 310 of the image forming apparatus 5007 receives the preparation complete notification from the printing control apparatus 201, the CPU 310 begins to prepare to receive data, and when this preparation has been completed, it transmits a preparation complete notification to the printing control apparatus 201. Thereafter, program control is shifted to step S705.

Furthermore, when the CPU 107 of the printing control apparatus 201 receives the preparation complete notification from the image forming apparatus 5007, the CPU 107 advances the process to step S718, and transmits to the image forming apparatus 5007 the network setup information obtained at step S717.

At step S705, the CPU 310 of the image forming apparatus 5007 receives all the network setup information from the printing control apparatus 201, and thereafter shifts the process to step S706.

At step S706, the CPU 310 of the image forming apparatus 5007 performs the end process that was initiated at step S701 to establish data connection, and thereafter returns the process to the flowchart in FIG. 7.

It should be noted that during the process for obtaining data from the printing control apparatus 201, the printing control apparatus 201 may transmit network setup data when the image forming apparatus 5007 issues a request for that data to the printing control apparatus 201.

Further, the following method may be employed to obtain data (network setup information) from the printing control apparatus 201. After the printing control apparatus 201 has been activated, the CPU 107 of the printing control apparatus 201 transmits to the image forming apparatus 5007 data, such as network setup information, stored on the HDD 105, and the CPU 301 of the image forming apparatus 5007 stores the received data on the HDD 309. Then, at the timing described at step S405 in FIG. 7, the CPU 310 of the image forming apparatus 5007 obtains data that has been received from the printing control apparatus 201 and stored on the HDD 309.

The setup data reception processing performed for the first embodiment will now be explained while referring to FIG. 10.

Figure 10:
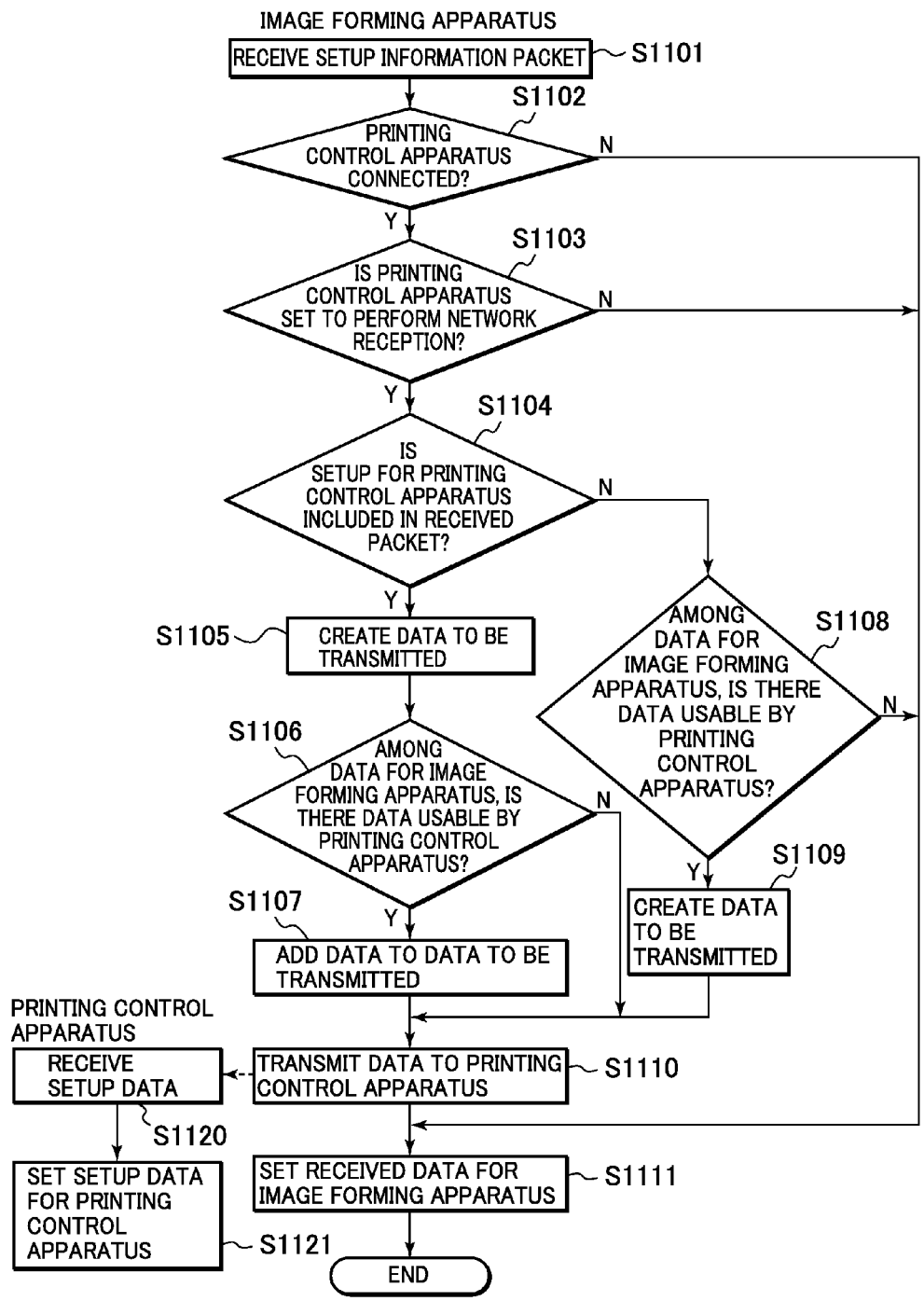
FIG. 10 is a flowchart showing example third control processing performed by the network system of the invention.

FIG. 10 is a flowchart showing an example third control processing performed by the network system according to this embodiment. This flowchart corresponds to the setup processing performed by the image forming apparatus 5007 upon receiving setup data, such as a setup value, an ID and an address table, and network setup information from another image forming apparatus. The processes at steps S1101 to S1111 in this flowchart are performed when the CPU 310 loads into the RAM 312 a program that is stored in the ROM 311, on the HDD 309 or in another recording medium, and executes the program. Further, the processes at steps S1120 and S1121 are performed when the CPU 107 of the printing control apparatus 201 loads into the second memory 108 a program that is stored on the HDD 309 or in another recording medium, and executes the program.

First, at step S1101, when the image forming apparatus 5007 receives setup data from another image forming apparatus, the CPU 310 of the image forming apparatus 5007 advances the process to step S1102.

At step S1102, the CPU 310 of the image forming apparatus 5007 performs an examination to determine whether the printing control apparatus 201 has been connected to the image forming apparatus 5007. For this examination, the method described at step S404 in FIG. 7 is employed.

When, at step S1102, the CPU 310 of the image forming apparatus 5007 determines that the printing control apparatus 201 has not been connected to the image forming apparatus 5007, program control is shifted to step S1111.

When, at step S1102, the CPU 310 of the image forming apparatus 5007 determines that the printing control apparatus 201 has been connected to the image forming apparatus 5007, program control advances to step S1103. At step S1103, the CPU 310 of the image forming apparatus 5007 examines the reception setup designated for the printing control apparatus 201 to determine whether the setup is for network reception. Specifically, a network communication path is established between the image forming apparatus 5007 and the printing control apparatus 201, and by using this communication path, setup information stored on the HDD 105 of the printing control apparatus 201 can be obtained from the printing control apparatus 201. Since this processing is the same as the processes at steps S701 to S703 and S711 to S715 in FIG. 9, the processing is not shown in FIG. 10 and a detailed description is omitted herein.

When, at step S1103, the CPU 310 determines that network reception has not been designated for the network setup that has been entered for the printing control apparatus 201, the CPU 310 shifts the process to step S1111.

When, at step S1103, the CPU 310 determines that network reception has been designated for the network setup that is entered for the printing control apparatus 201, the CPU 310 advances the process to step S1104.

At step S1104, the CPU 310 of the image forming apparatus 5007 determines whether setup information (for example, the data 902 in FIG. 8) for the printing control apparatus 201 is included in the setup information (the packet) received at step S1101. When setup information is not included, the CPU 310 shifts the process to step S1108.

At step S1108, the CPU 310 of the image forming apparatus 5007 determines whether data usable by the printing control apparatus 201 is included in setup data (for example, the data 901 in FIG. 8) addressed to the image forming apparatus 5007. It should be noted that data usable by the printing control apparatus 201 is, for example, an address book or the network setup entered in a "setup value" item. Furthermore, data usable by the printing control apparatus 201 may be stored in advance by the image forming apparatus 5007, or may be designated by user input.

When, at step S1108, the CPU 310 determines that no data usable by the printing control apparatus 201 is included in the setup data addressed to the image forming apparatus 5007, the CPU 310 shifts the process to step S1111.

When, at step S1108, the CPU 310 of the image forming apparatus 5007 determines that data usable by the printing control apparatus 201 is included in the setup data addressed to the image forming apparatus 507, the CPU 310 advances the process to step S1109. At step S1109, the CPU 310 of the image forming apparatus 5007 extracts, from the setup data addressed to the image forming apparatus 5007, information that can be used for setting up the printing control apparatus 201, prepares data to be transmitted to the printing control apparatus 201, and stores this data in the RAM 312. After the data to be transmitted has been prepared, the CPU 310 of the image forming apparatus 5007 advances the process to step S1110.

When, at step S1104, the CPU 310 of the image forming apparatus 5007 determines that setup information (e.g., the data 902 in FIG. 8) for the printing control apparatus 201 is included in the setup information received at step S1101, the CPU 310 advances the process to step S1105.

At step S1105, the CPU 310 of the image forming apparatus 5007 obtains from the setup information (packet) received at step S1101 the setup information (for example, the data 901 in FIG. 8) for the printing control apparatus 201. Then, the CPU 310 prepares the data to be transmitted, and stores the data in the RAM 312.

At step S1106, the CPU 310 of the image forming apparatus 5007 determines whether data usable by the printing control apparatus 201 is included in the setup data addressed to the image forming apparatus 5007.

When, at step S1106, the CPU 310 of the image forming apparatus 5007 determines that data usable by the printing control apparatus 201 is not included in the setup data addressed to the image forming apparatus 5007, the CPU 310 shifts the process to step S1110.

When, at step S1106, the CPU 310 determines that data usable by the printing control apparatus 201 is included in the setup data addressed to the image forming apparatus 5007, the CPU 310 extracts from the setup data addressed to the image forming apparatus 5007 information that can be used for setting up the printing control apparatus 201. Following this, at step S1107, the CPU 310 adds the extracted information to the data to be transmitted, which has been prepared at step S1105 and is stored in the RAM 312. The CPU 310 thereafter shifts the process to step S1110.

At step S1110, the CPU 310 of the image forming apparatus 5007 transmits to the printing control apparatus 201 the data to be transmitted that has been prepared and stored in the RAM 312. When the printing control apparatus 201 receives the setup data from the image forming apparatus 5007 (step S1120), the CPU 107 of the printing control apparatus 201 stores the received setup data on the HDD 105. Then, the values included in the setup data are entered to the individual setup items (step S1121).

Further, when the image forming apparatus 5007 has transmitted the data at step S1110, the CPU 310 of the image forming apparatus 5007 shifts the process to step S1111.

At step S1111, the CPU 310 of the image forming apparatus 5007 stores the setup information received at step S1101 on the HDD 309 of the image forming apparatus 5007. The processing is then terminated. At this time, a user can also designate items that are to receive data. For items for which data need not be received, no data is designated and the processing is terminated.

When setup data is to be transferred to the printing control apparatus 201 at step S1110, the data may be encrypted. When data received at step S1101 is encrypted, data to be transmitted to the printing control apparatus 201 may also be encrypted.

As described above, when the printing control apparatus 201 is connected to the image forming apparatus 5007, the network setup information can be included in setup data to be delivered by the image forming apparatus 5007.

Since network setup information is also included in setup data received from another image forming apparatus, the image forming apparatus 5007 can designate, for the connected printing control apparatus 201, network setup information that is included in the received setup information.

Therefore, the setting up is required only once for a pair consisting of an image forming apparatus and a printing control apparatus, so that multiple image forming apparatuses and a printing control apparatus can be simultaneously set up.

Further, since setup information for the printing control apparatus is included in setup data for the image forming apparatus, through only one operation a setup can be provided for the image forming apparatus and the printing control apparatus.

Second Exemplary Embodiment

According to a second embodiment of the present invention, an image forming apparatus 5007 does not perform an examination to determine whether a printing control apparatus 201 has been connected, and instead, only transmits data for the image forming apparatus 5007. Then, upon receiving the data, the printing control apparatus 201 adds to the received data the data for the printing control apparatus 201, and again transmits the resultant data to a delivery destination. A detailed explanation will be given for this embodiment.

The setup data delivery processing for the second embodiment will now be described while referring to FIG. 11.

Figure 11:
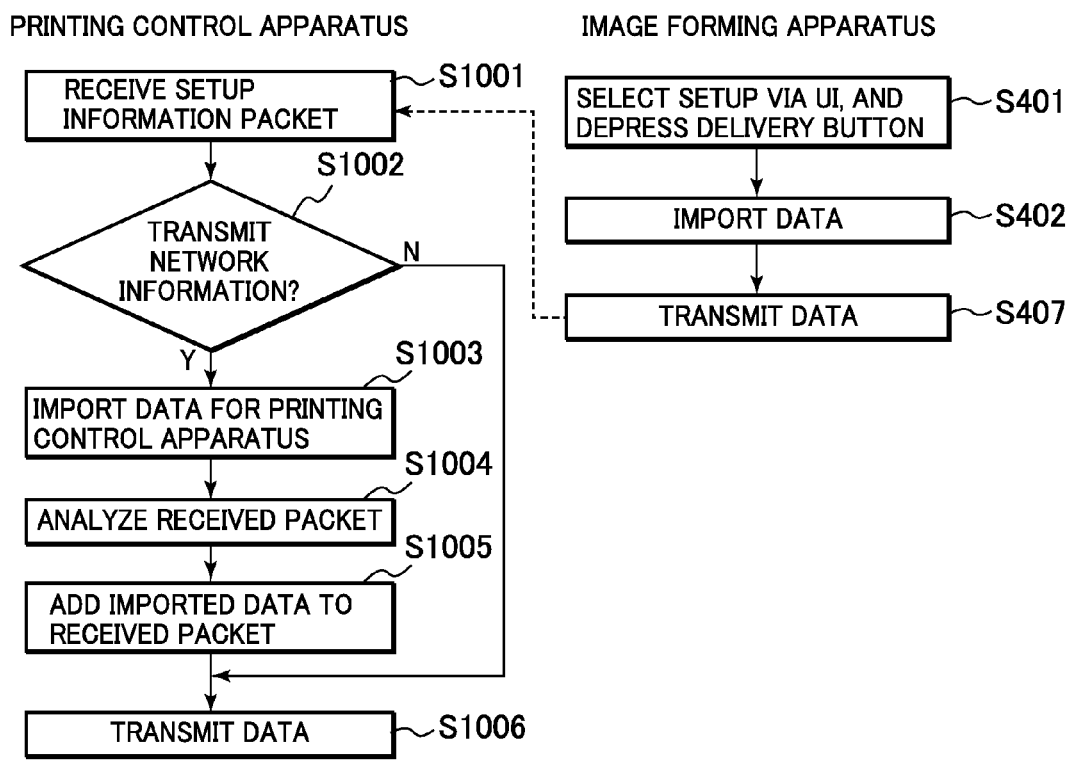
FIG. 11 is a flowchart showing example fourth control processing performed by the network system of the invention.

FIG. 11 is a flowchart showing an example fourth control processing performed by a network system according to the second embodiment. The processing in this flowchart corresponds to the process performed when the image forming apparatus 5007 transmits setup data, such as a setup value, an ID and an address table, stored in the image forming apparatus 5007. The processing also corresponds to the process performed when the printing control apparatus 201 adds to data to be transmitted network setup information that is stored in the printing control apparatus 201, and transmits the resultant data to another apparatus. The processes at steps S401, S402 and S407 in the flowchart are performed when a CPU 310 loads into a RAM 312 a program stored in a ROM 311, on an HDD 309, or in another recording medium, and executes the program. The same step numbers as are used in FIG. 7 are provided for steps corresponding to those in FIG. 7, and no further explanation for them will be provided herein. Furthermore, the processes at steps S1001 to S1006 are performed when a CPU 107 of the printing control apparatus 201 loads into a second memory 108 a program stored on the HDD 309 or in another recording medium, and executes the program.

First, at step S1001, when the CPU 107 of the printing control apparatus 201 receives from the image forming apparatus 5007 a packet that includes setup information, the CPU 107 stores the received setup information in the second memory 108, and then shifts the process to step S1002.

At step S1002, the CPU 107 of the printing control apparatus 201 determines whether the transmission of network setup information has been designated for the printing control apparatus 201 (designated in the transmission setup column 802 in FIG. 6). Specifically, the CPU 107 of the printing control apparatus 201 reads the transmission setup for the network setup that is stored on an HDD 105 of the printing control apparatus 201, and employs the obtained transmission setup for the determination.

When, at step S1002, the CPU 107 determines that the transmission of network setup information has not been not designated as the network setup transmission setup for the printing control apparatus 201, the CPU 107 shifts the process to step S1006.

When, at step S1002, the CPU 107 determines that the transmission of network setup information has been designated as the network setup transmission setup entered for the printing control apparatus 201, the CPU 107 advances the process to step S1003.

At step S1003, the CPU 107 of the printing control apparatus 201 obtains (imports) the network setup stored on the HDD 105 of the printing control apparatus 201. The CPU 107 then shifts the process to step S1004.

Sequentially, the CPU 107 of the printing control apparatus 201 analyzes the packet received from the image forming apparatus 5007 at step S1001. When data received from the image forming apparatus 5007 is encrypted, the printing control apparatus 201 decrypts and analyzes the data. When, for example, data is encrypted by employing various keys and uses SSL (Secure Socket Layer), the printing control apparatus 201 obtains from the image forming apparatus 5007 a key used for encryption, and decodes the data using this key.

When an analysis for the received data has ended at step S1004, the CPU 107 of the printing control apparatus 201 advances the process to step S1005. At step S1005, the CPU 107 adds data imported at step S1003 to the setup information that has been received from the image forming apparatus 5007 at step S1001 and is stored in the second memory 108 of the printing control apparatus 201. Then, the resultant data is stored in the second memory 108 of the printing control apparatus 201. The method as explained in the first embodiment is employed for adding data.

When data is added to the received packet at step S1005, the CPU 107 of the printing control apparatus 201 shifts the process to step S1006.

At step S1006, the CPU 107 of the printing control apparatus 201 transmits the setup information stored in the second memory 108 of the printing control apparatus 201 to the individual delivery destinations of the setup information that was received from the image forming apparatus 5007 at step S1001. When the data received from the image forming apparatus 5007 was encrypted, the decrypted data is again encrypted by employing a key that was used by the image forming apparatus 5007 for encryption, and the encrypted data is transmitted. For this data encryption, the key generated by the printing control apparatus 201 may be employed.

As described above, when the printing control apparatus 201 is connected to the image forming apparatus 5007, the printing control apparatus 201 also delivers network setup information for the printing control apparatus 201, together with setup data received from the image forming apparatus 5007. Therefore, the setting up is required only once for a pair consisting of an image forming apparatus and a printing control apparatus, so that multiple image forming apparatuses and a printing control apparatus can be set up.

In addition, since the setup information for the printing control apparatus is included in the setup data for the image forming apparatus, through only one operation, the setup can be provided for the image forming apparatus and the printing control apparatus.

Third Exemplary Embodiment

According to a third embodiment of the present invention, when a printing control apparatus 201 receives a packet that includes setup information from an image forming apparatus 5007, the printing control apparatus 201 identifies a delivery destination based on the packet and independently transmits the data to the delivery destination.

When the printing control apparatus 201 receives a packet including setup information from the image forming apparatus 5007, a CPU 107 of the printing control apparatus 201 transmits the packet to the delivery destination of the packet, without adding any data to the packet.

At this time, the CPU 107 of the printing control apparatus 201 stores in a second memory 108 information for the packet delivery destination, and obtains network setup information from an HDD 105 of the printing control apparatus 201. Then, the CPU 107 generates a new setup information packet based on the obtained network setup information, and transmits the generated setup information packet to the delivery destination that is stored in the second memory 108.

As described above, when the printing control apparatus 201 is connected to the image forming apparatus 5007, the printing control apparatus 201 still delivers network setup information for the printing control apparatus 201 to the address for the setup data transmitted by the image forming apparatus 5007. Therefore, the setting up is required only once for a pair consisting of an image forming apparatus and a printing control apparatus, so that multiple image forming apparatuses and a printing control apparatus can be set up.

Further, since the setup information for the printing control apparatus is included in the setup data for the image forming apparatus, through only one operation, the setup can be provided for the image forming apparatus and the printing control apparatus.

Fourth Exemplary Embodiment

According to the configuration for a fourth embodiment of the present invention, a printing control apparatus 201 obtains network setup information for the printing control apparatus 201 that is included in setup data received from another image forming apparatus, and designates the obtained network setup information for the printing control apparatus 201. A detailed explanation will be given for the fourth embodiment.

The setup data reception processing according to the fourth embodiment will now be described while referring to FIG. 12.

Figure 12:
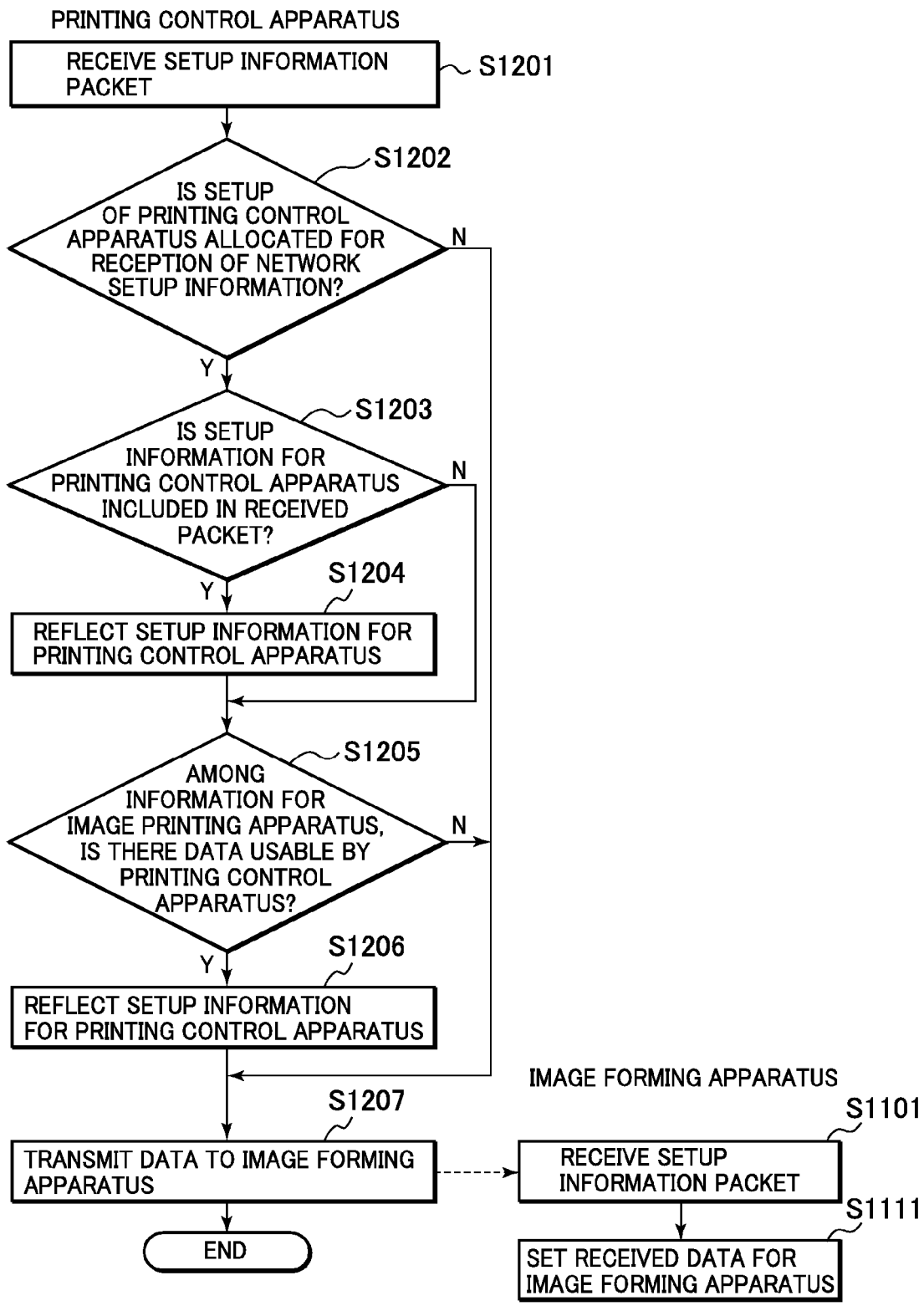
FIG. 12 is a flowchart showing example fifth control processing performed by the network system of the invention.

FIG. 12 is a flowchart showing example fifth control processing performed by a network according to the fourth embodiment. This processing corresponds to the processing performed when the printing control apparatus 201 receives setup data from another image forming apparatus. The processes at steps S1101 and S1111 are performed when a CPU 310 loads into a RAM 312 a program stored in a ROM 311, on an HDD 309 or in another recording medium, and executes the program. The same step numbers as are used in FIG. 10 are provided for corresponding steps, and no further explanation for them will be provided herein. Further, the processes at steps S1201 to S1207 are performed when a CPU 107 of the printing control apparatus 201 loads into a second memory 108 a program stored on an HDD 309 or in another recording medium, and executes the program.

First, when the CPU 107 of the printing control apparatus 201 receives a setup information packet from another image forming apparatus via a LAN 5001 (step S1201), the CPU 107 shifts the process to step S1202.

At step S1202, the CPU 107 of the printing control apparatus 201 examines reception setup of the network setup designated for the printing control apparatus 201.

When, at step S1202, the CPU 107 determines that the reception of network setup information has not been designated as a network setup reception setup that is entered for the printing control apparatus 201, the CPU 107 shifts the process to step S1207.

When, at step S1202, the CPU 107 determines that the reception of network setup information has been designated as a network setup reception setup that is entered for the printing control apparatus 201, the CPU 107 advances to step S1203.

At step S1203, the CPU 107 of the printing control apparatus 201 determines whether setup information (for example, the data 902 in FIG. 8) for the printing control apparatus 201 is included in setup information (a packet) received at step S1201. When the setup information is not included, the CPU 107 shifts the process to step S1205.

When, at step S1203, the CPU 107 determines that the setup information (for example, the data 902 in FIG. 8) for the printing control apparatus 201 is included in the setup information (a packet) received at step S1201, the CPU 107 advances the process to step S1204.

At step S1204, the CPU 107 of the printing control apparatus 201 obtains setup information (for example, the data 902 in FIG. 8) for the printing control apparatus 201 from the setup information (a packet) received at step S1201. Then, the CPU 107 employs the obtained data to create setup data in order to designate data for the printing control apparatus 201. After the setup data is been prepared, the CPU 107 employs the setup data to enter values for the individual items of the printing control apparatus 201. After the values have been entered, the CPU 107 shifts the process to step S1205.

At step S1205, the CPU 107 determines whether data usable by the printing control apparatus 201 are included in the setup data (for example, the data 901 in FIG. 8) that are addressed to the image forming apparatus 5007 and that are included in the setup information (a packet) received at step S1201. Specifically, data usable by the printing control apparatus 201 is, for example, an address book and a network setup in the "setup value" item.

When, at step S1205, the CPU 107 determines that data usable by the printing control apparatus 201 is not included in the setup data that is included in the setup information received at step S1201 and that is addressed to the image forming apparatus 5007, the CPU 107 shifts the process to step S1207.

When, at step 1205, the CPU 107 determines that data usable by the printing control apparatus 201 is included in the setup data that is included in the setup information received at step S1201 and that is addressed to the image forming apparatus 5007, the CPU 107 advances the process to step S1206.

At step S1206, the CPU 107 of the printing control apparatus 201 obtains data usable by the printing control apparatus 201 from among the setup data (for example, the data 901 in FIG. 8) that is included in the setup information (a packet) received at step S1201 and that is addressed to the image forming apparatus 5007. Then, based on the obtained data, the CPU 107 prepares setup data in order to designate data for the printing control apparatus 201. After the setup data has been prepared, the CPU 107 employs the setup data to enter values for the individual items of the printing control apparatus 201. After the setup has been completed, the CPU 107 shifts the process to step S1207.

At step S1207, the CPU 107 of the printing control apparatus 201 transmits to the image forming apparatus 5007 the setup information (packet) received at step S1201. When data received from a different image forming apparatus at S1201 is encrypted, the printing control apparatus 201 decrypts the received data to obtain information for the printing control apparatus. Thereafter, the printing control apparatus 201 again encrypts the data using the encryption method employed by the different image forming apparatus, and transfers the encrypted data to the image forming apparatus 5007.

As described above, when the printing control apparatus 201 is connected to the image forming apparatus 5007, the printing control apparatus 201 also extracts network setup information included in setup data received from another image forming apparatus, and designates the network setup information for the printing control apparatus 201. Therefore, the setting up is required only once for a pair consisting of an image forming apparatus and a printing control apparatus, so that multiple image forming apparatuses and a printing control apparatus can be set up.

In the above described embodiments, the network setup information for the printing control apparatus 201 has been transmitted. However, information for the printing control apparatus 201 to be transmitted is not limited to the network setup information. Transmission of information for various setups, such as a printing setup, a user setup, an address book setup and a service setup, is also included in the present invention.

Further, the terminal device 5009 shown in FIG. 2 may generate setup data shown in FIG. 8 and deliver the setup data to individual image forming apparatuses to provide the setup for the individual image forming apparatuses and the printing control apparatus.

Furthermore, the terminal device 5009 shown in FIG. 2 may be set as a delivery destination included in setup data in FIG. 8, and this setup data may be delivered to the terminal device 5009 and stored (as a backup) in the terminal device 5009.

In addition, an apparatus that can be applied for the network system of the invention is not applied for a case wherein a multifunctional apparatus (image processing apparatus), such as the image forming apparatus 5007, is connected to the printing control apparatus 201. The network system of this invention can also be applied for a case wherein a second data processing apparatus is connected to a first data processing apparatus. That is, when setup information for the first data processing apparatus is transmitted to another apparatus via a network, setup information for the connected second data processing apparatus may be transmitted with it.

As described above, when the image forming apparatus delivers apparatus information (setup information), the image forming apparatus obtains from the printing control apparatus various setup information for the printing control apparatus, and transmits (delivers) the setup information with other setup information that is to be delivered. Or, the printing control apparatus transmits (delivers) a variety of setup information for the printing control apparatus, along with apparatus information (setup information) delivered by the image forming apparatus.

In addition, when setup information for the printing control apparatus is added to data that the image forming apparatus has received from another apparatus, the image forming apparatus transmits the setup information to the connected printing control apparatus to provide the setup for the printing control apparatus. Or, when setup information for the printing control apparatus is added to data that have been received by the printing control apparatus that is connected to the image forming apparatus, the printing control apparatus provides this setup for its own use, based on the setup information.

According to this arrangement, for the image forming apparatus to which the printing control apparatus is attached, the setup related to a network can be delivered during the delivery of apparatus information, and the collective setup can be provided for the printing control apparatus and the image forming apparatus.

Therefore, the setting up is required only once for a pair consisting of an image forming apparatus and a printing control apparatus, so that the setup can be provided for multiple image forming apparatus, and various setup information for the printing control apparatus is enabled.

In addition, since the setup information for the printing control apparatus is included in setup data for the image forming apparatus, through only one operation, the setup can be provided for the image forming apparatus and the printing control apparatus.

The structure of the setup data in FIG. 8 and the contents of the setup data are not limited to those described, and the setup data can employ various structures and various contents in accordance with specific usages and purposes that would enable practice of the present invention.

The embodiments of the invention have been explained, and the present invention can also be provided as a system, an apparatus, a method, a program or a recording medium. Specifically, the present invention can be applied for a system constituted by a plurality of apparatuses, or for an apparatus that includes only one device.

Next, while referring to a memory map shown in FIG. 13, an explanation will be given for the structure of a data processing program readable by the image forming apparatus 5007 and the printing control apparatus 201 that constitute the network system of the present invention.

FIG. 13 is a diagram for explaining the memory map of a storage medium (recording medium) on which are stored various data processing programs readable by the image forming apparatus 5007 and the printing control apparatus 201 that constitute the network system of the present invention.

Although not specifically shown, information, such as version information and a creator's name, for managing program groups stored on the storage medium is also stored. Further, information that depends on the operating system (OS) on a program reading side, e.g., an icon used to identify a program on a display, may also be stored.

In addition, subject data for various programs are also stored in directory information. A program for installing various programs in a computer, or a program for decompressing a compressed program to be installed, may also be stored.

The functions shown in FIGS. 7, 9, 10, 11 and 12 for the embodiments may be performed by a host computer using programs that are externally installed. The present invention can also be applied for a case wherein information groups including a program are supplied to an output device by means of a storage medium, such as a CD-ROM, a flash memory or an FD, or by means of an external storage medium via a network.

To achieve the objective of the invention, in the above described manner, the storage medium on which software program code that provides the function of the above embodiments may be supplied to a system or to an apparatus. That is, the objective of the invention is achieved when the computer (a CPU or an MPU) of the system or the apparatus reads and executes program code stored on a storage medium.

In this case, the program code read from the storage medium constitutes the new function of the invention, and the storage medium on which the program code is stored constitutes the present invention.

Therefore, so long as the function of the program is included, an arbitrary program form can be employed, for example, for object code, a program executed by an interpreter or script data supplied to the OS.

An example storage medium for supplying a program can be a floppy disk, a hard disk, an optical disk, a magneto-optical disk, an MO, a CD-ROM, a CD-R, a CD-RW, a magnetic tape, a nonvolatile memory card, a ROM or a DVD.

In this case, the program code read from a storage medium provides the functions of the above embodiments, and the storage medium on which the program code is stored constitutes the present invention.

Another program supply method is as follows. An internet homepage is accessed using the browser of a client computer, and a computer program for the present invention, or a compressed file that includes an automatic installation function is downloaded from the homepage and is supplied, in this manner, to a storage medium, such as a hard disk. As another method, program code that constitutes a program for this invention is divided into a plurality of files, and by downloading these files from different homepages, the program can also supplied. That is, a WWW server or an FTP server, from which a plurality of users can download a program file that permits a computer to perform the function of the present invention, are also included in the claims of the present invention.

Further, as another method, the program of the invention is encrypted and the encrypted program is stored on storage media, such as CD-ROMs, which are distributed to users. Thereafter, a user who satisfies a predetermined condition is permitted to download, from the homepage via the Internet, key information for decrypting the program. Then, by using the key information, the user executes the encrypted program to install it on the computer.

Furthermore, the present invention also includes a case wherein, based on an instruction in the program code, the OS running on a computer performs part, or all of the actual processing, and through this processing, provides all the functions of the embodiments.

In addition, the present invention also includes the following case. Program code read from a storage medium is written into a memory prepared for a function extension board inserted into a computer, or a function extension unit connected to the computer. In accordance with instructions included in the program code, the CPU provided for the function extension board or the function extension unit performs part or all of the actual processing, and through this processing, provides all the functions of the embodiments.

The present invention may be applied for a system constituted by a plurality of apparatuses, or an apparatus that includes only one device. Further, the present invention can be applied for a case wherein a program is supplied either to a system or to an apparatus. In this case, when the system or the apparatus reads from a storage medium a software program that achieves the present invention, the system or the apparatus can obtain the effects provided by the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-253220, filed Sep. 1, 2005, which is hereby incorporated by reference herein in its entirety.

What is claimed is:

1. A network system comprising:
    a control apparatus configured to connect to a first network;
    a first image processing apparatus connected to the control apparatus via a second network so as to access the first network through the control apparatus;
    a determination unit adapted to, in a case that setup information to be set to a second image processing apparatus on the first network is transmitted, determine whether network setup information is to be transmitted; and
    a transmitting unit adapted to transmit, to the second image processing apparatus, setup information held by the first image processing apparatus and network setup information held by the control apparatus if the determination unit determines that the network setup information is to be transmitted, and to transmit, to the second image processing apparatus, the setup information held by the first image processing apparatus if the determination unit determines that the network setup information is not to be transmitted.

2. A network system according to claim 1, wherein the transmitting unit obtains the network setup information held by the control apparatus from the control apparatus, and transmits the obtained network setup information with the setup information held by the first image processing apparatus.

3. A network system according to claim 1, wherein the transmitting unit obtains the setup information held by the first image processing apparatus from the first image processing apparatus, and transmits the obtained setup information with the network setup information held by the control apparatus.

4. A network system according to claim 1, wherein the transmitting unit permits the control apparatus to transmit the setup information held by the first image processing apparatus to the second image processing apparatus, and wherein the transmitting unit permits the control apparatus to transmit the network setup information held by the control apparatus to a transmission destination for the setup information of the first image processing apparatus.

5. A network system according to claim 1, wherein the setup information held by the first image processing apparatus includes at least either an address table or user setup information.

6. A network system according to claim 1, wherein the network setup information held by the control apparatus includes DNS setup information.

7. A network system setting method, for setting setup information for a network system that includes a control apparatus configured to connect to a first network and a first image processing apparatus connected to the control apparatus via a second network so as to access the first network via the control apparatus, the method comprising:

determining, in a case that setup information to be set to a second image processing apparatus on the first network is transmitted, whether network setup informant is to be transmitted; and transmitting, to the second image processing apparatus, setup information held by the first image processing apparatus and network setup information held by the control apparatus if it is determined that the network setup information is to be transmitted, and transmitting, to the second image processing apparatus, the setup information held by the first image processing apparatus if it is determined that the network setup information is not to be transmitted.

8. A non-transitory storage medium on which a computer readable program is stored to permit a computer to execute the network system setup method according to claim 7.

* * * * *